United States Patent [19]
Mehra

[11] Patent Number: 5,974,537
[45] Date of Patent: *Oct. 26, 1999

[54] GUARD BITS IN A VLIW INSTRUCTION CONTROL ROUTING OF OPERATIONS TO FUNCTIONAL UNITS ALLOWING TWO ISSUE SLOTS TO SPECIFY THE SAME FUNCTIONAL UNIT

[75] Inventor: Vijay Krishna Mehra, Freemont, Calif.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/998,486
[22] Filed: Dec. 29, 1997
[51] Int. Cl.$^6$ .................................................. G06F 9/38
[52] U.S. Cl. ............................................. 712/215; 712/24
[58] Field of Search ..................................... 712/200, 203, 712/213, 214, 215, 234, 23, 24

[56] References Cited

U.S. PATENT DOCUMENTS

| | | | |
|---|---|---|---|
| 5,333,280 | 7/1994 | Ishikawa | 712/241 |
| 5,442,760 | 8/1995 | Rustad et al. | 712/215 |
| 5,450,556 | 9/1995 | Slavenburg et al. | 712/23 |
| 5,560,028 | 9/1996 | Sachs et al. | 712/23 |
| 5,600,810 | 2/1997 | Ohkami | 712/226 |
| 5,774,737 | 6/1998 | Nakano | 712/24 |

OTHER PUBLICATIONS

IEEE Comput. Soc. Press, "An Evaluation of the iHARP Multiple Instruction Issue Processor", Fleur L. Steven et al, pp. 437–444, 1994.

John R. Ellis, "Bulldog: A Cpmplier for VLIW Architectures", MIT Press 1985, ISBN 0–262–05034–X.

P. Y–T. Hsu, "Highly Concurrent Scalar Processing," Thesis, Univ. of Illinois at Urbana–Champaign, 1986.

*Primary Examiner*—Viet D. Vu
*Attorney, Agent, or Firm*—Anne E. Barschall

[57] ABSTRACT

A very long instruction word (VLIW) architecture describes a processor comprising multiple functional units operating in parallel. A very long instruction word contains a plurality of fields or issue slots for specifying which operations are to be performed by the functional units. Execution of an operation can be inhibited by a guard value specified in the issue slot. Instructions are dispatched in such a guarded VLIW architecture by routing one of a plurality of fields issued for a common functional unit based on the guard value. Thus, an instruction word may contain a greater number of issue slots than there are functional units.

35 Claims, 6 Drawing Sheets

GUARD BITS IN A VLIW INSTRUCTION CONTROL ROUTING OF OPERATIONS TO FUNCTIONAL UNITS ALLOWING TWO ISSUE SLOTS TO SPECIFY THE SAME FUNCTIONAL UNIT

FIELD OF THE INVENTION

The present invention relates to the architecture of very long instruction word (VLIW) processors and more particularly to a method and apparatus for dispatching instructions for VLIW processors.

BACKGROUND OF THE INVENTION

Escalating demands for increased computer processing performance have led to the introduction of highly parallel computer architectures, in which multiple operations are simultaneously executed. Designed to exploit the fine-grained parallelism inherent in high-level language programs, a very long instruction word (VLIW) processor comprises multiple, parallel functional units controlled on a cycle-by-cycle basis by a very long instruction word (i.e., 100 or more bits). Very long instruction words comprise a concatenation of fields or "issue slots," each of which independently specifies the operation of a functional unit. VLIW processors are used in a variety of applications including super-computers and mainframes, workstations and personal computers, and dedicated processors in audio and video consumer products.

FIG. 1 illustrates a conventional VLIW processor 100. On each machine cycle, very long instruction words are loaded or "issued" from an instruction memory 110 into an instruction issue register 120. Instruction memory 110, which can be a random access memory (RAM) or a read only memory (ROM), is typically pipelined and supplemented by an instruction cache (not shown) to enhance execution throughput. Each instruction word loaded into instruction issue register 120 contains a number of issue slots 121–127, each issue slot 121–127 for controlling a corresponding functional unit 131–137 in the VLIW processor 100. In general, a VLIW processor may comprise any useful combination of functional units, and FIG. 1 depicts one such combination. Depending on the particular implementation, there may be more or fewer functional units, and there may be functional units of different types. Functional units may perform a variety of operations, selected by an operation code (opcode); for example, an arithmetic-logic functional unit can add and subtract two values.

Each issue slot 121–127 within an instruction word loaded into the instruction issue register 120 specifies an operation to be started in the current clock cycle for the corresponding functional unit 131–137. In particular, each issue slot 121–127 typically contains an opcode and operands for the corresponding functional unit 131–137. The opcode is useful for functional units that perform a variety of different operations.

Operands for the functional units 131–137 are read from a shared, multi-ported register file 140, and results from the functional unit 131–137 are written into the register file 140.

The term "specification of an operation" as used herein refers to a combination of an opcode, if needed, and operands, if needed, employed to specify an operation of a functional unit. Thus, each issue slot 121–127 contains a specification of operation to be executed by a corresponding functional unit 131–137.

Referring to FIG. 2, issue slot 121 contains a specification of the operation 210 of the constant generation unit 131, namely, a constant value CONSTANT and a register RD to hold the constant value. The specification of the operation 220 of arithmetic-logic units (ALU) 132 and 133 contained in respective issue slots 122 and 123 holds an ALU opcode, two source registers RA and RB, and a destination register RD for the operation of respective. Typical ALU opcodes indicate operations such as addition, subtraction, negation, logical and, logical or, logical exclusive or, logical complementation, and the like. Issue slot 124 holds a specification 240 containing a MUL opcode for multiplication, division, or square root, source registers RA and RB, and a destination register RD for the multiplier unit 134. Issue slot 125 includes specification 250 having an FPU opcode (e.g., addition, subtraction, and comparison), source registers RA and RB, and destination register RD for the floating point unit 135. A data memory unit 136 is controlled by issue slot 126, having a specification 260 including a MEM opcode, indicating a load or store operation, address registers RA and RB, and a data register RD. The jump control unit 137 with reference to specification 270 in the corresponding issue slot 137 uses register RA and RB to indicate a conditional value and a jump destination address within instruction memory 110; the specification 270 also holds a JMP opcode specifying whether to jump always (unconditional jump), jump if the conditional value register is true, jump if the register is false, or not jump at all (NOP). The contents of these issue slots 121–127, the operation of the functional unit 131–137, and the format of specifications 210–270 are to be regarded as exemplary and may be adjusted to suit any useful configuration.

In order for a software program to run on a VLIW machine, a "fine grained parallel" or "instruction level parallel" translation must be found. This is accomplished by a compiler that translates a conventional high-level programming language, such as ANSI-C, into VLIW instructions. Such compilers are described in John R. Ellis, *BULL-DOG: A Compiler for VLIW Architectures*, MIT Press 1985, ISBN 0-262-05034-X. Functional units in conventional VLIW processors are controlled by exactly one issue slot in the instruction word. For example, the VLIW processor 100 depicted in FIG. 1 includes seven issue slots 121–127 corresponding to the seven respective functional units 131–137. Thus, compilers for conventional VLIW processors emit instructions in which a functional unit is controlled by values in a signal issue slot.

High performance processors, including VLIW processors, are subject to the so-called "branch delay" problem caused by the latency of instruction memory, which is the time in machine cycles between the transmission of an instruction address to an instruction memory and the receipt of the corresponding instruction word for execution. During sequential execution, the address of the next instruction can be predicted, allowing the instruction memory to be pipelined for an effective instruction memory latency of one machine cycle. For conditional jumps, however, the address of the next instruction cannot be predicted, because the destination address depends on the outcome of evaluating a conditional expression. Consequently, the branch delay represents a number of machine cycles in which the instruction word at the destination address is not available due to the evaluation of the conditional expression and instruction memory latency. As functional units are made even faster, for example, by aggressive pipelining, this latency increases. In a high-speed, pipelined architecture, it is very undesirable to wait for the instruction word at the destination of the jump instruction to be fetched from instruction memory before continuing execution of the instructions.

One solution to the branch delay problem was suggested by P. Y-T. Hsu, "Highly Concurrent Scalar Processing," Thesis, University of Illinois at Urbana-Champaign, 1986, which involves continuing to issue instructions during the branch delay period for all possible program paths in parallel, insofar as allowed by the limited number of functional units. Each operation, however, is "guarded" by a Boolean expression so that only those operations satisfying the boolean expression or "guard value" are allowed to be performed. These guard values are constructed by the compiler in such a way as to insure that only those operations on the intended program path are executed.

One disadvantage with current VLIW processors is evident when two or more of the parallel program paths in the branch delay period include operations pertaining to the same functional unit, such as a floating point unit 135. Since each functional unit is controlled by exactly one issue slot in the instruction word, operations for the same functional unit along different parallel program paths must be issued in separate instructions. For example, both program paths of a numerical analysis program may employ floating point operations after a conditional branch. In a VLIW processor with one floating point unit 135, only one floating point operation can be issued in each instruction. Thus, the floating point operations along one path, e.g. the "condition true" path, must be issued in different instructions than the floating point operations along the other path, e.g. the "condition false" path. Consequently, extra instructions need to be scheduled by the compiler, increasing code size and reducing execution times.

As depicted in FIG. 1, one conventional approach in alleviating this disadvantage is to provide another implementation of the same functional unit. For example, the conventional VLIW processor 100 includes two arithmetic-logic units 132 and 133. While a second arithmetic-logic may not be prohibitively expensive, a second floating point unit is expensive to implement again on a monolithic semiconductor device in terms of consumption of surface area and power. Other complex functional units, such as multipliers, barrel shifters, and even data memory units, are also expensive to duplicate.

SUMMARY OF THE INVENTION

Accordingly, there exists a need for an instruction dispatching method and a mechanism that can issue a plurality of operations along respective program paths for a functional unit in a single instruction word. There is also a need for a cost-effective method and mechanism for issuing two or more operations for a common functional unit in a single instruction word.

These and other needs are met by the present invention in which one of a plurality of guarded operations specified in a single instruction word is routed to a common functional unit based on guard values associated with the operations. Consequently, compilers can emit instructions having more than one issue slot conditionally controlling a common functional unit. In fact, an instruction word may contain a greater number of issue slots than there are functional units.

One aspect of the present invention is a very long instruction word (VLIW) processor for executing a sequence of very long instruction words specifying multiple operations to be executed in parallel. The VLIW processor comprises multiple functional units for executing in parallel at least some of the operations specified by a very long instruction word. An instruction register stores the very long instruction word, which has multiple fields, each field including: an identifier for selecting one of the functional units, a specification of an operation to be executed by the selected functional unit, and a guard value for indicating whether or not to inhibit the operation. A routing circuit delivers the specification of the operation to be executed from the instruction register to the selected functional unit according to the associated guard value, e.g. only if the guard value indicates that the operation is not inhibited.

Another aspect of the present invention is a VLIW processor for executing a sequence of very long instruction words specifying multiple operations to be executed in parallel. The VLIW processor comprises multiple functional units for executing the operations in parallel and an instruction register for storing the very long instruction word. The very long instruction word has multiple fields, the number of which is greater than the number of functional units. A routing circuit delivers contents of one of the fields in the instruction from the instruction register to the associated functional unit. For example, each field may include a specification of an operation to be executed by an associated functional and a guard value for indicating whether or not to inhibit the operation and controlling the routing circuit.

Still another aspect of the present invention is a method of dispatching instructions in a VLIW processor comprising the step of issuing a very long instruction word having multiple fields. Each field includes an identifier for selecting one of multiple functional units, a specification of an operation to be executed by the selected functional unit, and a guard value for indicating whether or not to inhibit the operation. The specifications within the fields are routed to corresponding functional units based on the guard values, and the operation specified by the routed specification is performed.

Yet another aspect of the present invention is a method of dispatching instructions in a VLIW processor comprising the step of issuing a very long instruction word having multiple fields. The contents within the fields are routed to the associated functional units, the number of which is less than the number of fields in the very long instruction word, and the operation specified by the routed content is performed. Each field may include a specification of an operation to be executed by an associated functional unit from among multiple functional units, and a guard value for indicating whether or not to inhibit the operation and controlling how the field contents are routed.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An improved VLIW instruction dispatch method and mechanism are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention addresses and solves the problems associated with inflexible operation scheduling during the branch delay period in conventional VLIW processors by multiplexing the inputs to functional units from more than one issue slot based on the guard values. The guard values indicate separate program paths after a branch condition. Since each issue slot contains a guard value, operations in issue slots are associated with a program path after a branch condition. If the guard values of two issue slots in a single instruction word for a common functional unit indicate mutually exclusive program paths, then the two issue slots are not in contention, because one of the issue slots is inhibited by its guard value, while the other is not inhibited by its guard value. Consequently, instructions can be issued controlling the common functional unit in two or more issue slots along mutually exclusive program paths. This approach is cost-effective because an extra multiplexer is typically much cheaper to implement than a second functional unit, such as a data memory unit, a floating point unit, a multiplier, and a barrel shifter.

Figure 3:
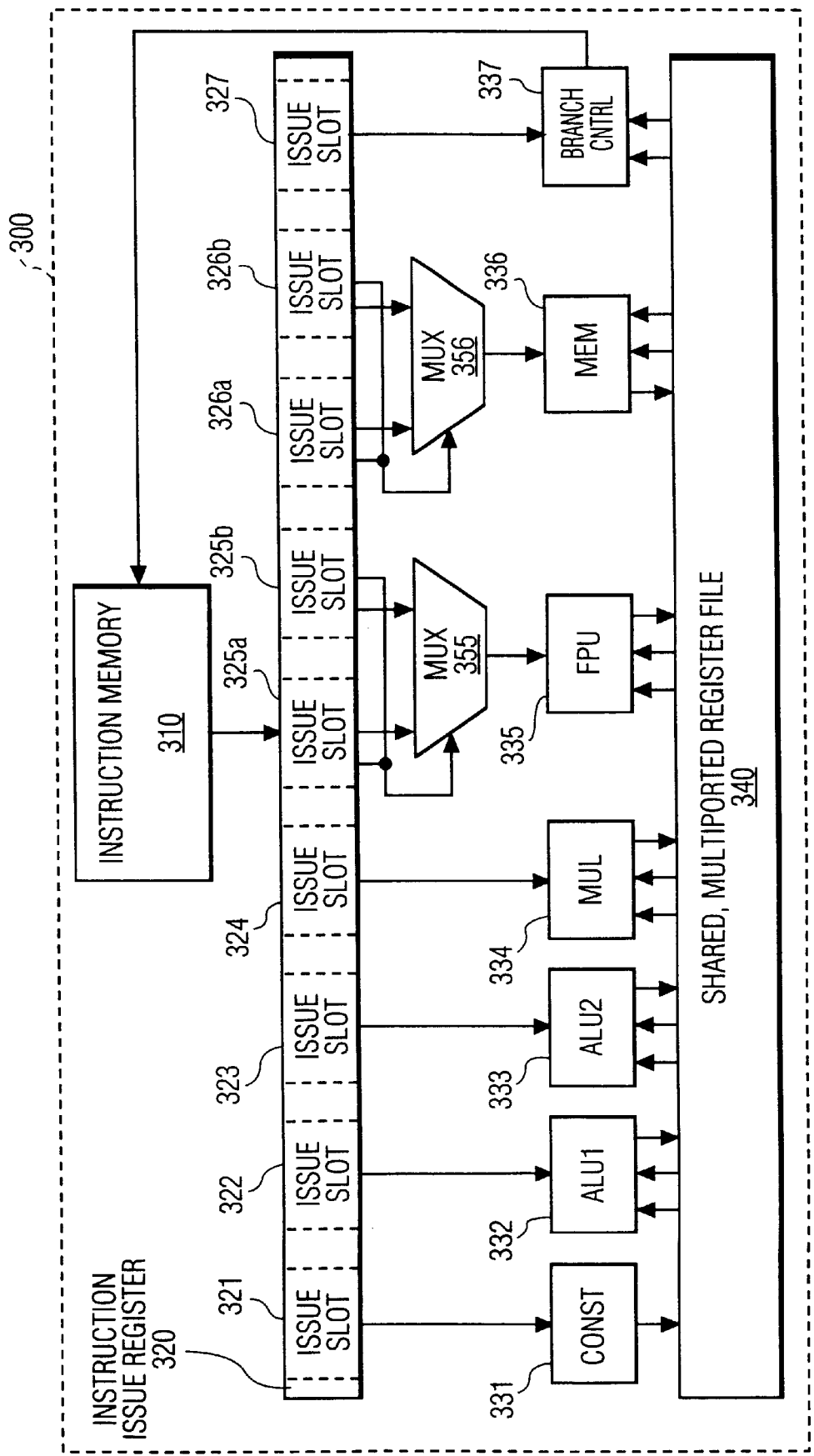
FIG. 3 depicts a VLIW processor according to one embodiment of the present invention.

According to one embodiment of the present invention, additional issue slots are designated for particular functional units. An instruction issue register thus contains more issue slots than there are functional units. Referring to FIG. 3, as VLIW processor 300 is depicted in which issue slots 321–327 are positionally associated with corresponding functional units 331–337; i.e., particular positions within the instruction issue register 320 are designated for particular functional units. Seven functional units 331–337 are depicted in FIG. 3, viz. a constant generation unit 331, a first arithmetic-logic unit 332, a second arithmetic-logic unit 333, a multiplier 335, a floating-point unit 335, a data memory unit 336, and a branch control unit 337, respectively corresponding to the functional units 131–137, described herein above.

Figure 1:
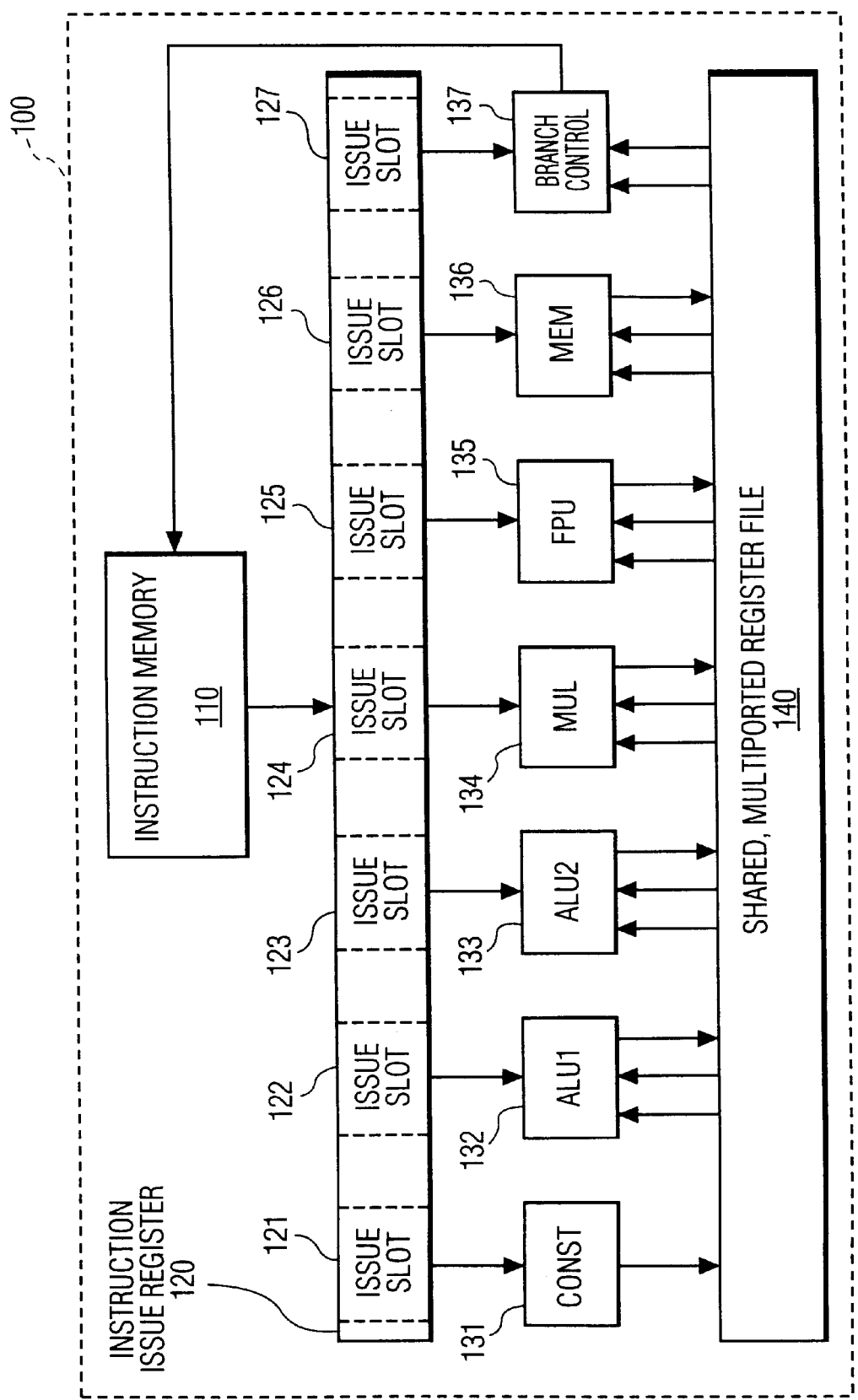
FIG. 1 depicts a conventional VLIW processor.
Figure 2:
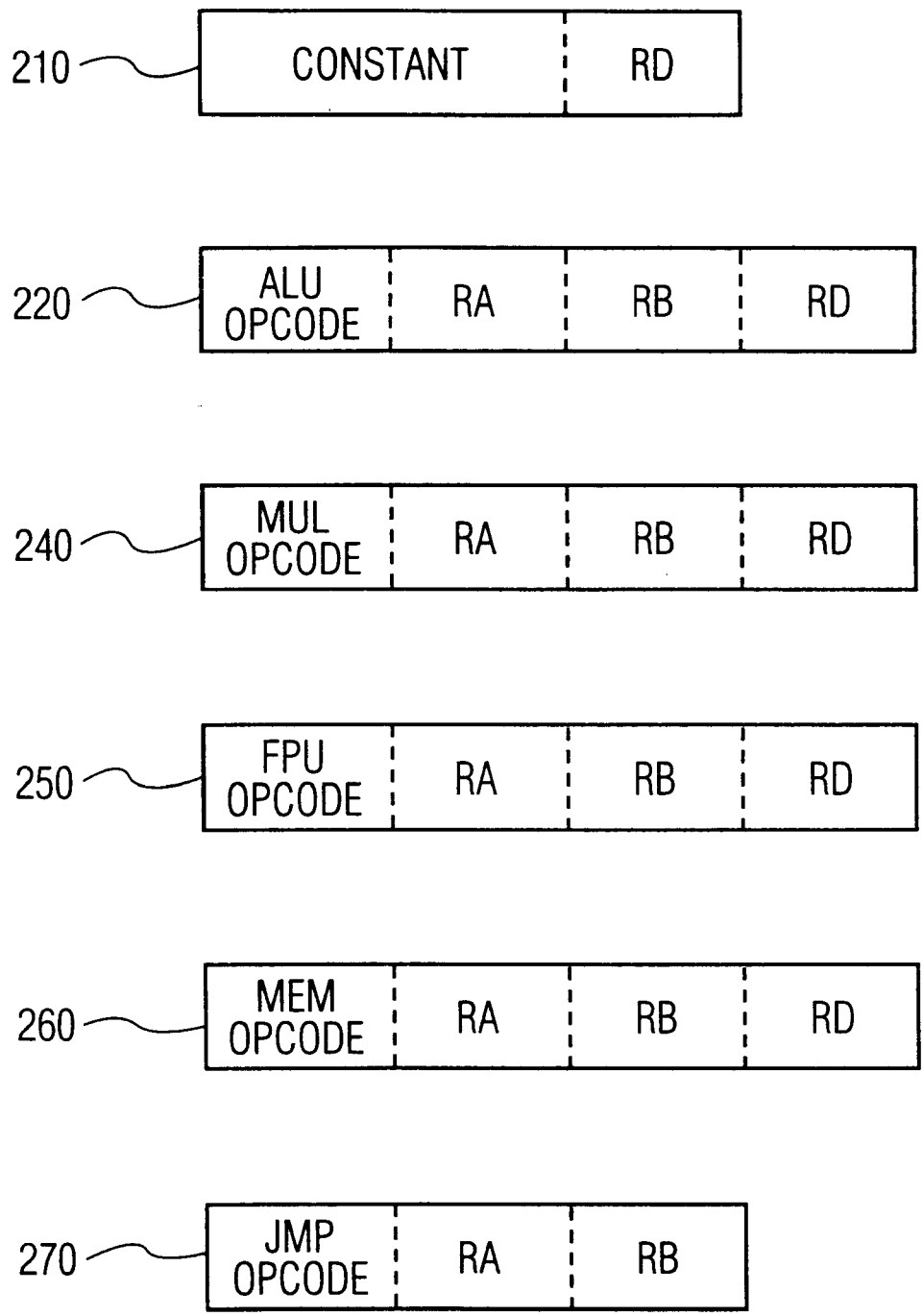
FIG. 2 illustrates formats of conventional VLIW issue slots.
Figure 4:
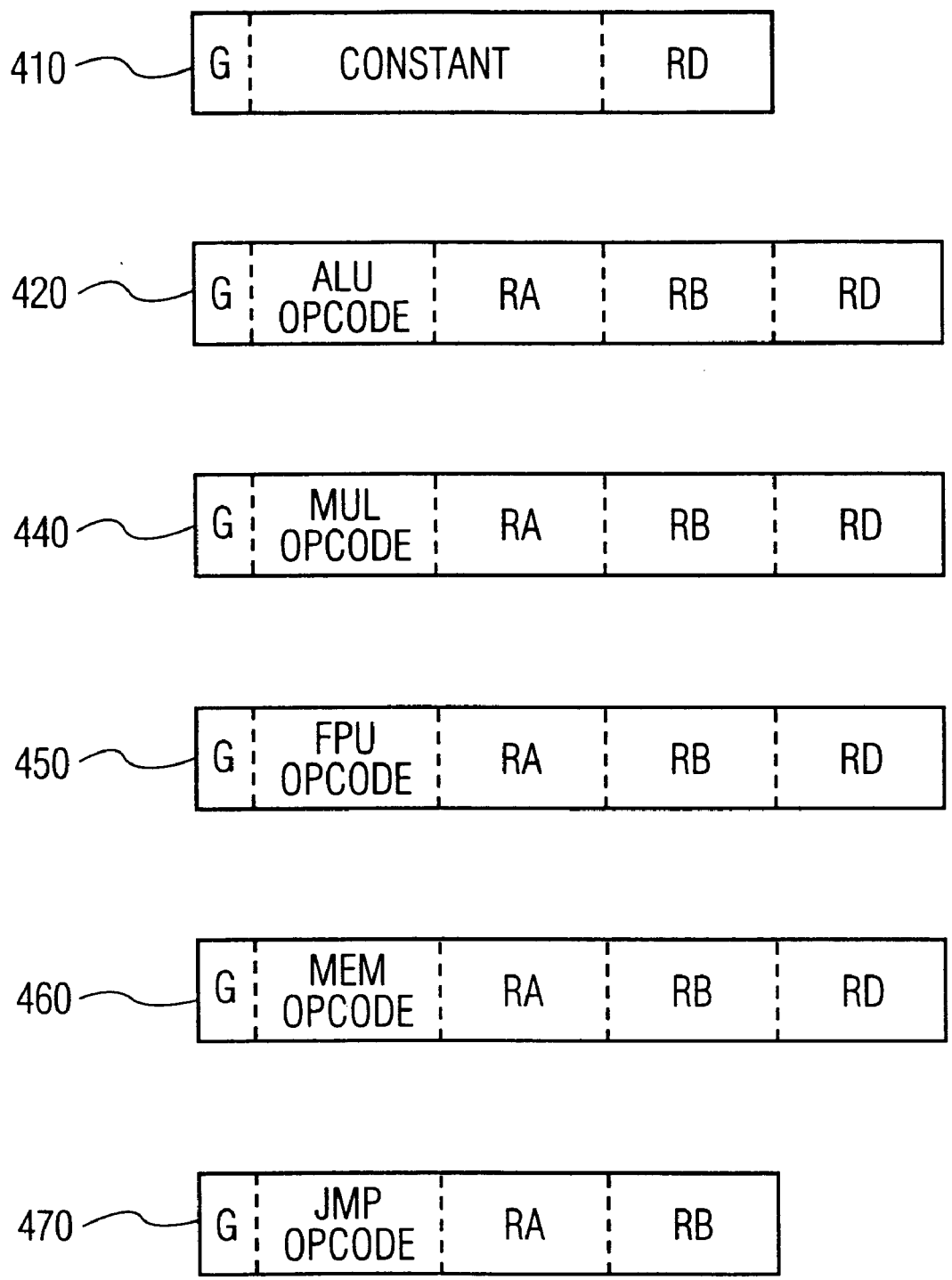
FIG. 4 illustrates formats of VLIW issue slots according to an embodiment of the present invention.

Associated with each of the seven functional units 331–337 are nine issue slots 321–327, wherein floating point unit 335 is associated with two issue slots 325a and 325b and data memory unit 336 is associated with two issue slots 326a and 326b. Referring to FIG. 4, issue slots 321–327 contain operation parcels 410–470 that include a guard value G and a specification of the operation (e.g. an opcode and operands, if needed). The guard value G indicates which program path the operation is to be executed. One implementation of guard values is disclosed in the commonly assigned U.S. Pat. No. 5,450,556 issued on Sep. 12, 1995 to Slavenburg et al., incorporated herein by reference, wherein the guard value specifies a path expression that matches path information generated by the branch control unit 137. For example, if the branch control unit 137 implement three-way branches, then a program path can be expressed in a guard value by two bits. Guard values can also express conditional program paths due to subsequent branching in the branch delay period by concatenation. The specification of the operation within operation parcels 410–470 contain similar subfields such as opcodes and operands as described herein above with respect to specifications 210–270 in FIG. 2. The contents of these issue slots 321–327, the operation of the functional units 331–337, and the format of specifications in operation parcels 410–470 are to be regarded as exemplary and may be adjusted to suit any useful configuration.

Multiplexer 355 has inputs coupled to the instruction register 320 at issue slots 325a and 325b. The output of multiplexer 355 is coupled to the floating point unit 335. Thus, multiplexer 355 routes an opcode and operands from one of the issue slots 325a and 325b to the floating point unit 335. Similarly, a multiplexer 356 has inputs coupled to the instruction register 320 at issue slots 326a and 326b, and the output of multiplexer 356 is coupled to the data memory unit 336. Thus, multiplexer 356 routes an opcode and operands from one of the issue slots 326a and 326b via to the data memory unit 336.

Both multiplexers 355 and 356 are switched by guard values derived from the associated issue slots 325a/325b and 326a/326b, respectively, so that the opcode and operands for the non-inhibited issue slot is routed to the associated functional unit. According to one implementation, the guard values are compared against the current program path maintained by the branch control unit 337. For example, issue slot 325a contains a guard value "1" that indicates a true condition in a branch path, while issue slot 325b contains a guard value "0" that indicates a false condition in a branch path. Thus, if the true condition branch path is chosen, then the current program path becomes a "1" and the multiplexer 355 selects the opcode and operand from the issue slot that has a guard value that matches the current program path, namely issue slot 325a. On the other hand, if the false condition branch path is chosen, then the current program path becomes a "0" and the multiplexer 325 selects the opcode and operand from the other issue slot 325b. Consequently, an instruction can be issued from instruction memory 310 into instruction issue register 320 so that a common functional unit, such as a floating point unit 335, can be controlled along either branch path. In this situation, a compiler can emit instructions having issue slots controlling a common functional unit insofar as the guard values for the issue slots are mutually exclusive.

During operation, a very long instruction word is fetched from instruction memory 310, which can be a pipelined cache coupled to a RAM or a ROM, and stored in instruction issue register 320. Instruction issue register 320 contains a plurality of fields for issue slots 321–227 corresponding to a functional unit 331–337. Some of the issue slots, e.g. issue slots 325a and 325b, correspond to a common functional unit, e.g. floating point unit 335, in which case a multiplexer 355 is configured to route a specification of an operation to be performed by the floating point unit 335 from one of the issue slots 325a and 325b. The multiplexer 355 is also configured to select an opcode and operands from one of the issue slots 325a and 325b based on the respective guard values stored therein. As another example, issue slots 326a and 326b correspond to the data memory unit 336, and multiplexer 356 is configured to route a specification of an operation to be performed by the data memory unit 336 from one of the issue slots 326a and 326b. The multiplexer 356 is also configured to select an opcode and operands from one of the issue slots 326a and 326b based on the respective guard values stored therein. Consequently, a single instruction word executed during the branch delay can effectively utilize a selected functional unit, e.g. floating point unit 335 and data memory unit 336, along every mutually exclusive program path. When the functional units are operated during a machine cycle, data is fetched from register file 340 and results are written back into register file 340 based upon operands routed from issue slots 321–327 of the instruction issue register 320 to the corresponding functional units 331–337.

As described herein above, the embodiment of the present invention illustrated in FIG. 3 expands the size of the instruction word in order to designate additional issue slots for desired functional units. In some implementation environments, however, this embodiment of the present invention is subject to some disadvantages. For example, in sequential operation, only one of the issue slots for a given functional unit will be utilized, thereby increasing the bandwidth requirements to sustain the VLIW processor at or near peak performance. Further, the increased size of the instruction word raises the cost of instruction memories, caches, and buses. Finally, the size of compiled code for a VLIW compiled program is larger, thereby reducing the overall cost-performance of the program.

Figure 5:
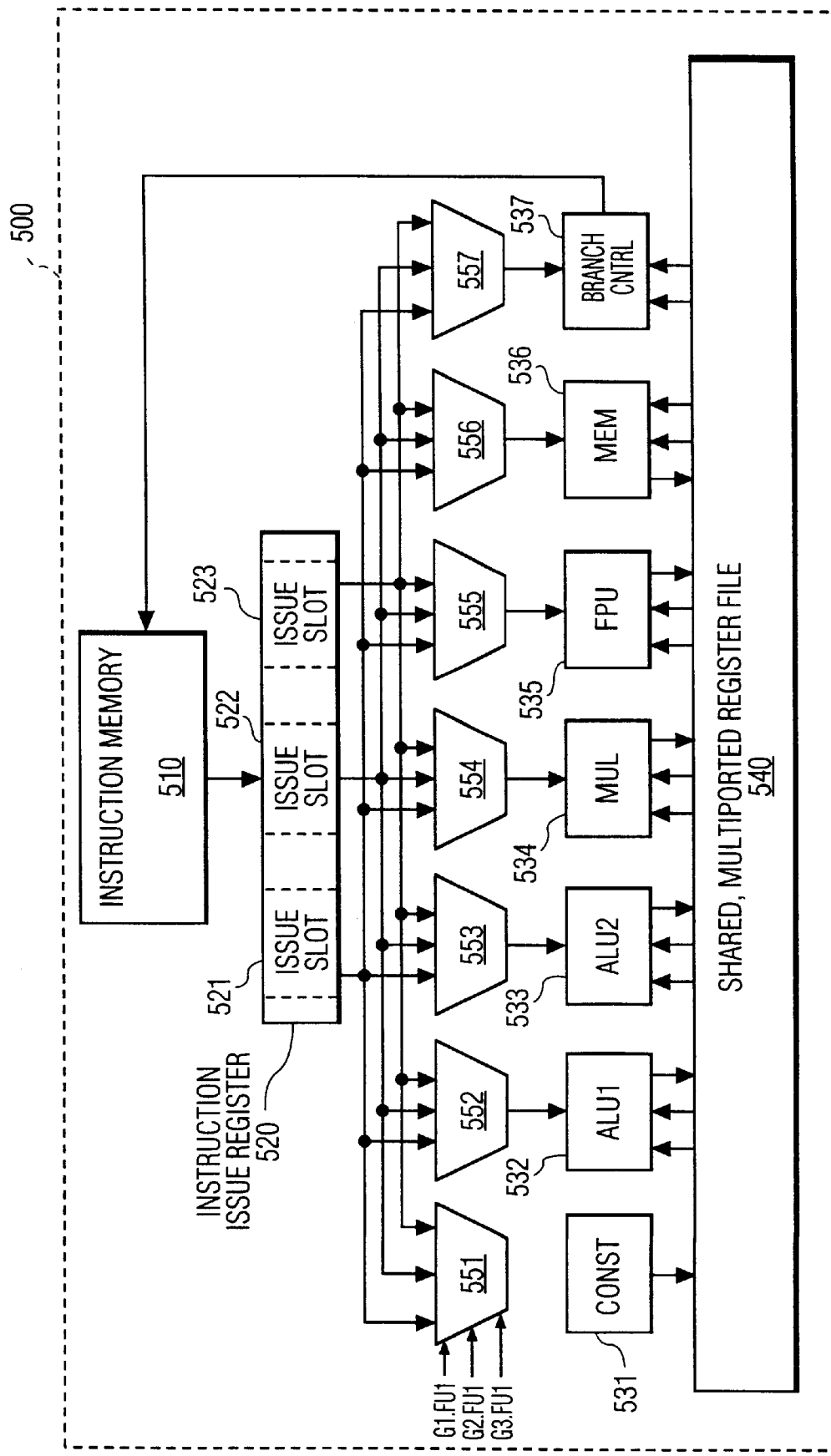
FIG. 5 depicts a VLIW processor according to another embodiment of the present invention.

One approach to address these difficulties, disclosed in the co-pending, commonly assigned U.S. application Ser. No. 08/175,060 and incorporated herein by reference, is to associate a functional unit identifier in each issue slot. In accordance with another embodiment of the present invention, illustrated in FIG. 5, VLIW processor 500 uses instruction words having only three issue slots 521–523 in instruction issue register 520, wherein each issue slot 521–523. The VLIW processor 500 includes routing circuitry comprising multiplexers 551–557 coupled to instruction issue register 520 at each issue slot 521–523 delivering the operands contained therein to the identified functional unit 531–537. Seven such functional units 531–537 are depicted in FIG. 5: a constant generation unit 531, a first arithmetic-logic unit 532, a second arithmetic-logic unit 533, a multiplier 535, a floating-point unit 535, a data memory unit 536, and a branch control unit 537, respectively corresponding to the functional units 131–137, described herein above.

Figure 6:
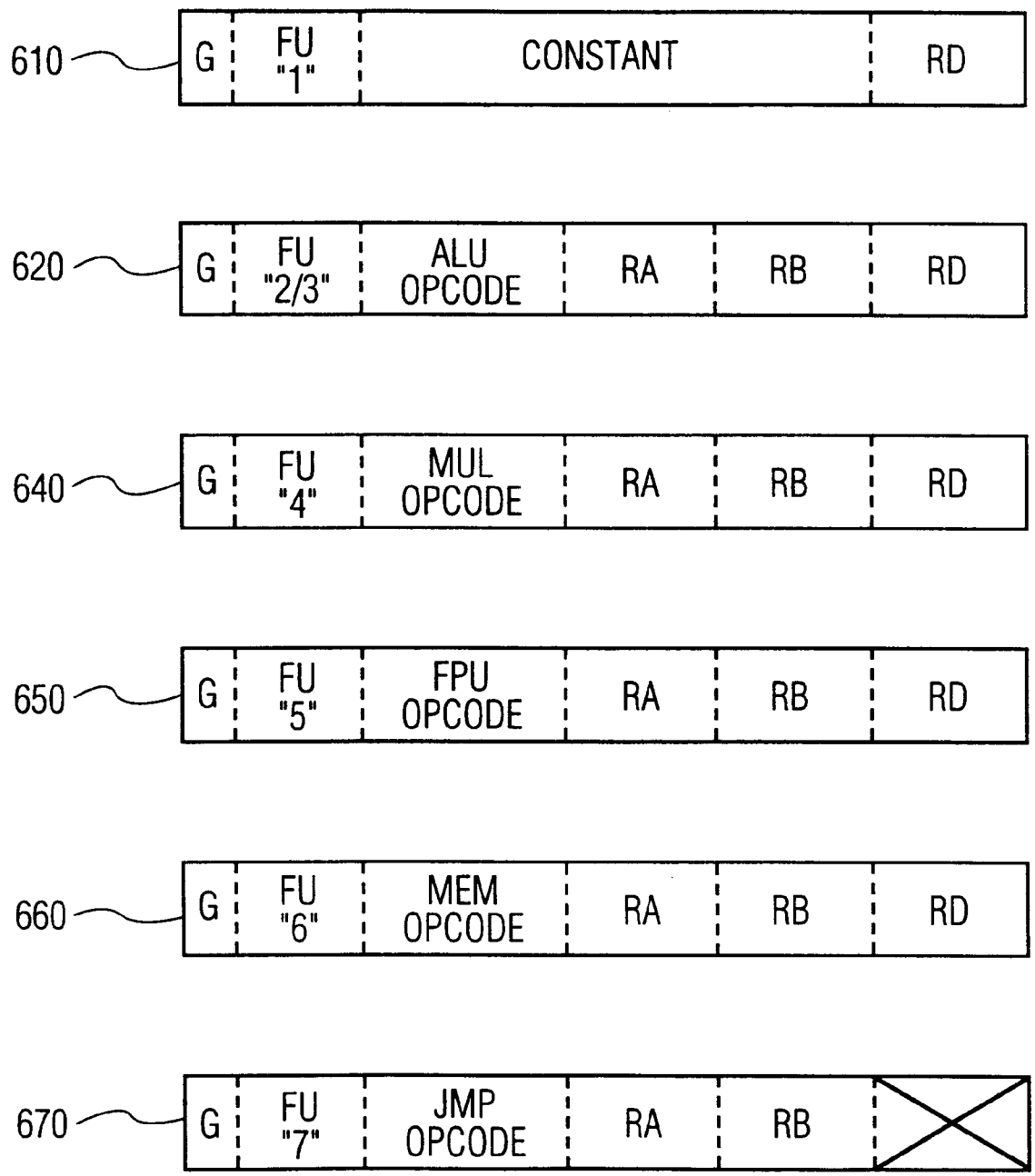
FIG. 6 illustrates formats of VLIW issue slots according to another embodiment of the present invention.

Referring to FIG. 6, issue slots 521–523 contain operation parcels 610–670 that include a guard value G, a functional unit identifier FU, and a specification of the operation (e.g. an opcode and operands, if needed). As described in more detail herein above, The guard value G indicates which program path the operation is to be executed. A functional unit identifier FU can be an integer or other scalar value, for example, a three-bit number from 0–7, wherein a value of "1" indicates the constant generation unit 531 of FIG. 5. The specification of the operation within operation parcels 610–670 contain similar subfields such as opcodes and operands as described herein above with respect to specifications 210–270 in FIG. 2. The contents of these issue slots 521–523, the operation of the functional units 531–537, and the format of specifications in operation parcels 610–670 are to be regarded as exemplary and may be adjusted to suit any useful configuration.

Each multiplexer 531–337 selects one of the issue slots 521–323 based on the guard values and functional unit identifiers contained therein and outputs the contents of a selected issue slot 521–523 to a respective functional unit 531–537. For example, multiplexer 551 is associated with the constant generation unit 531 and outputs a selected issue slot 521–523 thereto. More specifically, multiplexers 551–557 select the contents of only those issue slots 521–523 that contain a functional unit identifier of the associated functional unit 531–537. Furthermore, in contrast to the arrangement disclosed in U.S. application Ser. No. 08/715,060, multiplexers 551–557 select the contents of only those issue slots 521–523 that contain a guard value that indicates that the current program path is not inhibited. The multiplexers 551–557 may be implemented as two multiplexers coupled in series: the first multiplexer selects among the issue slots that match the functional unit, based on comparing the functional unit identifiers FU, and the second multiplexer selects among the remaining issues that match of the current program path, based on comparing the guard values G.

For instance, multiplexer 551 is configured to select among all three issue slots 521–523 for an operation parcel destined for constant generation unit 531. More specifically, multiplexer 551 makes the selection among issue slots 521–523 based on whether the issue slots 521–523 have a functional unit identifier that identifies the constant generation unit 531. In the example, since the constant generation unit 531 is identified by the number "1", only those issue slots 521–523 are chosen in which the functional unit identifier, FU1, FU2, and FU3, respectively, contained therein is a "1." Moreover, the multiplexer 551 selects from among the issue slots 521–523 based on whether the guard value indicates that the current program path is not inhibited. According to one implementation, the guard values are compared against the current program path maintained by the branch control unit 537. For example, issue slot 521 contains a guard value G1 of "1" that indicates a true condition in a branch path, a functional unit identifier FU1 of "1" to indicate the constant generation unit 531. Issue slot 522 has a guard value G2 of "0" that indicates a false condition in a branch path and a functional unit identifier FU2 of "1," and issue slot 523 has a guard value G3 of "1" and a functional unit identifier FU3 of "2". For multiplexer 551, issue slot 523 will not be chosen since its functional unit identifier FU3 of "2" does not match the identifier "1" assigned to the corresponding functional unit 531. If the true condition branch path is chosen, then the current program path becomes a "1" and multiplexer 551 selects the opcode and operand from the remaining issue slot that has a guard value that matches the current program path, namely issue slot 521. On the other hand, if the false condition branch path is chosen, then the current program path becomes a "0" and the multiplexer 551 selects the opcode and operand from the other issue slot 522.

Thus, in order for an issue slot 521–323 to be selected by a multiplexer 551–557, both the functional unit identifier must correspond to the functional unit 531–537 associated with the multiplexer 551–557 and the guard value must indicate that the current program path is not inhibited. Two or more issue slots 521–523 can contain functional unit identifiers for the same functional unit 531–537 if their respective guard value indicate mutually exclusive programs paths. For example, both issue slots 521 and 522 may contain a functional unit identifier for the constant generation unit 531 but guard values for different and mutually exclusive program paths. Thus, the constant generation unit 531 can be operated by a single guarded instruction notwithstanding which program path is currently executing During operation, a very long instruction word is fetched from instruction memory 510, which can be a pipelined cache coupled to a RAM or a ROM, and stored in instruction issue register 520. Instruction issue register 320 contains a plurality of fields for issue slots 521–523, each field containing a functional unit identifier and a guard value. Coupled to each issue slot 521–523 of instruction issue register 320 are multiplexers 551–557, each associated with and coupled to a respective functional unit 531–537. Multiplexers 551–557 select the contents of one of the issue slots 521–523 if the functional unit identifier for the issue slot 521–523 identifies the respective functional unit 531–537 and the guard value is not inhibited. Consequently, a single instruction word executed during the branch delay can effectively utilize a selected functional unit, e.g. constant generation unit 531, along every mutually exclusive program path. When the functional units are operated during a machine cycle, data is fetched from register file 340 and results are written back into register file 540 based upon operands routed from issue slots 521–523 of the instruction issue register 520 to the corresponding functional units 531–537.

While this invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A very long instruction word (VLIW) processor for executing a sequence of very long instruction words specifying a plurality of operations to be executed in parallel, said VLIW processor comprising:
    a plurality of functional units for executing in parallel at least some of said plurality of operations specified by a very long instruction word;
    an instruction register for storing the very long instruction word, said very long instruction word having a plurality of fields, each field including;
        an identifier for selecting one of said plurality of functional units,
        a specification of an operation to be executed by said selected functional unit, and
        a guard value for indicating whether or not to inhibit said operation; and
    a routing circuit coupled to said plurality of functional units and said instruction register for delivering the specification of the operation to be executed from said instruction register to said selected functional unit based on said guard value.

2. The VLIW processor of claim 1, wherein the routing circuit is configured to deliver the specification of the operation to be executed from said instruction register to said selected functional unit only when said guard value indicates that the operation is not inhibited.

3. The VLIW processor of claim 2, wherein at least two of said plurality of fields in said very long instruction word include respective identifiers for selecting a same functional unit.

4. The VLIW processor of claim 3, wherein:
    a single field from among said at least two of said plurality of fields has a guard value that indicates not to inhibit said operation; and
    each of remaining fields from among said at least two of said plurality of fields has a respective guard value that indicates to inhibit said operation.

5. The VLIW processor of claim 4, wherein the same functional unit comprises a data memory functional unit.

6. The VLIW processor of claim 2, wherein said specification of an operation includes an operation code specifying a type of operation to be performed by said selected functional unit.

7. The VLIW processor of claim 6, wherein said specification of an operation further includes an operand upon which said functional unit performs said operation.

8. The VLIW processor of claim 2, wherein said routing circuit includes a multiplexer coupled to said selected functional unit and said instruction register for selecting the specification of an operation to be executed in one of said plurality of fields wherein the identifier indicates said selected functional unit.

9. The VLIW processor of claim 8, wherein said multiplexer is switched according to the guard values of the fields wherein the identifier indicates said selected functional unit.

10. A very long instruction word (VLIW) processor for executing a sequence of very long instruction words specifying a plurality of operations to be executed in parallel, said VLIW processor comprising:
    a plurality of functional units for executing in parallel said plurality of operations specified by a very long instruction word;
    an instruction register for storing the very long instruction word, said instruction register having a plurality of fields for storing the plurality of operations;
    a routing circuit coupled to said plurality of functional units and said instruction register for delivering contents of one of said fields from said instruction register to said associated functional unit;
    wherein the number of fields in the instruction register is greater than the number of functional units.

11. The VLIW processor of claim 10, wherein:
    each field includes a specification of an operation to be executed by an associated functional unit from among said plurality of functional units, and a guard value for indicating whether or not to inhibit said operation; and
    said routing circuit is configured to deliver said one of said specifications of said operation to said associated functional unit based on said guard value.

12. The VLIW processor of claim 11, wherein the routing circuit is configured to deliver the specification of the operation to be executed from said instruction register to said selected functional unit only when said guard value indicates that the operation is not inhibited.

13. The VLIW processor of claim 12, wherein:
    a single field from among at least two of said plurality of fields associated with a selected functional unit has a guard value that indicates not to inhibit said operation; and
    each of remaining fields from among said at least two of said plurality of fields has a respective guard value that indicates to inhibit said operation.

14. The VLIW processor of claim 13, wherein the same functional unit comprises a data memory functional unit.

15. The VLIW processor of claim 12, wherein said specification of an operation includes an operation code specifying a type of operation to be performed by said selected functional unit.

16. The VLIW processor of claim 15, wherein said specification of an operation further includes an operand upon which said functional unit performs said operation.

17. The VLIW processor of claim 12, wherein said routing circuit includes a multiplexer coupled to a selected functional unit from among said plurality of functional units and said instruction register for selecting the specification of an operation to be executed in one of said plurality of fields associated with said selected functional unit.

18. The VLIW processor of claim 17, wherein said multiplexer is switched according to the guard values of the corresponding fields.

19. A method of dispatching instructions in a VLIW processor comprising the steps of:

issuing a very long instruction word having a plurality of fields, each field including:
an identifier for selecting one of a plurality of functional units,
a specification of an operation to be executed by said selected functional unit, and
a guard value for indicating whether or not to inhibit said operation;

routing the specifications of an operation to be executed within said fields to corresponding functional units based on the guard values; and performing the operation specified by the routed specification of an operation to be executed.

20. The method of claim 19, wherein said routing step includes routing the specifications of an operation to be executed within said fields to corresponding functional units only when said guard value indicates that the operation is not inhibited.

21. The method of claim 20, wherein at least two of said plurality of fields in said very long instruction word include respective identifiers for selecting a same functional unit.

22. The method of claim 21, wherein:

a single field from among said at least two of said plurality of fields has a guard value that indicates not to inhibit said operation; and each of remaining fields from among said at least two of said plurality of fields has a respective guard value that indicates to inhibit said operation.

23. The method of claim 22, wherein the same functional unit comprises a data memory functional unit.

24. The method of claim 20, wherein said specification of an operation includes an operation code specifying a type of operation to be performed by said selected functional unit.

25. The method of claim 24, wherein said specification of an operation further includes an operand upon which said functional unit performs said operation.

26. The method of claim 20, wherein said routing step includes selecting the specification of an operation to be executed in one of said plurality of fields wherein the identifier indicates said selected functional unit.

27. The method of claim 26, wherein said selecting step includes selecting the specification of an operation to be executed according to the guard values of the fields wherein the identifier indicates said selected functional unit.

28. A method of dispatching instructions in a VLIW processor comprising the steps of:

issuing a very long instruction word having from an instruction register having a plurality of fields;

routing contents of said fields to associated functional units; and performing an operation specified by the routed contents of the fields;

wherein the number of fields in the instruction register is greater than the number of functional units.

29. The method of claim 28, wherein:

each of said fields includes a specification of an operation to be executed by an associated functional unit from among a plurality of functional units, and a guard value for indicating whether or not to inhibit said operation;

the step of routing includes the step of routing the specifications of an operation to be executed within said fields to said associated functional units based on the guard values; and the step of performing includes the step of performing the operation specified by the routed specification of an operation to be executed.

30. The method of claim 29, wherein:

a single field from among at least two of said plurality of fields associated with a selected functional unit has a guard value that indicates not to inhibit said operation; and each of remaining fields from among at least two of said plurality of fields has a respective guard value that indicates to inhibit said operation.

31. The method of claim 29, wherein the same functional unit comprises a data memory functional unit.

32. The method of claim 29, wherein said specification of an operation includes an operation code specifying a type of operation to be performed by said associated functional unit.

33. The method of claim 32, wherein said specification of an operation further includes an operand upon which said associated functional unit performs said operation.

34. The method of claim 29, wherein said routing step includes selecting the specification of an operation to be executed in one of said plurality of fields associated with said selected functional unit.

35. The VLIW processor of claim 34, wherein said selecting step includes selecting the specification of an operation to be executed according to the guard values of the corresponding fields.

* * * * *